US006652796B1

United States Patent
Moriwaki et al.

(10) Patent No.: US 6,652,796 B1
(45) Date of Patent: Nov. 25, 2003

(54) METHOD FOR MANUFACTURING GLASS FIBER-REINFORCED RESIN MOLDINGS

(75) Inventors: Takeshi Moriwaki, Osaka (JP); Toshiharu Sakaguchi, Osaka (JP)

(73) Assignee: Kishimoto Sangyu Co Ltd, Osaka (JP)

( * ) Notice: Subject to any disclaimer, the term of this patent is extended or adjusted under 35 U.S.C. 154(b) by 0 days.

(21) Appl. No.: 09/700,170

(22) PCT Filed: May 5, 1999

(86) PCT No.: PCT/JP99/02769

§ 371 (c)(1),
(2), (4) Date: Nov. 13, 2000

(87) PCT Pub. No.: WO99/61516

PCT Pub. Date: Dec. 2, 1999

(30) Foreign Application Priority Data

May 26, 1998 (JP) ............................. 10-161443

(51) Int. Cl.$^7$ ............................. B29C 45/00; C08J 5/10
(52) U.S. Cl. ............................. 264/328.18; 264/328.1; 524/504; 524/37; 525/194
(58) Field of Search ............................. 264/328.18, 328.1, 264/330; 524/504, 37; 525/194

(56) References Cited

U.S. PATENT DOCUMENTS

| 4,735,988 A | * | 4/1988 | Takada et al. ............... 524/426 |
| 4,929,669 A | * | 5/1990 | Jensen ........................ 524/588 |
| 5,264,174 A |   | 11/1993 | Takei et al. |
| 5,653,534 A | * | 8/1997 | Matsumoto et al. ....... 366/76.1 |
| 5,779,843 A | * | 7/1998 | Kumagai et al. ......... 156/273.9 |
| 5,948,503 A | * | 9/1999 | Yamamoto et al. ......... 264/109 |
| 6,271,288 B1 | * | 8/2001 | Yamaguchi et al. .......... 524/37 |

FOREIGN PATENT DOCUMENTS

JP          6470535 A   *   3/1989

* cited by examiner

*Primary Examiner*—Jill L. Heitbrink
*Assistant Examiner*—Monica Fontaine
(74) *Attorney, Agent, or Firm*—Sherman & Shalloway

(57) ABSTRACT

In manufacturing glass fiber-reinforced resin moldings a peroxide is mixed into a molding material prepared by mixing glass fibers with a thermoplastic resin, and such a molding material is molded. The peroxide is fed together with the molding material in an injection molding machine, the molding material is heated and kneaded in the molding machine, and the glass fiber mixed molten resin is injected into a mold to obtain a molded body.

9 Claims, 1 Drawing Sheet

METHOD FOR MANUFACTURING GLASS FIBER-REINFORCED RESIN MOLDINGS

TECHNICAL FIELD

The present invention relates to a method for manufacturing glass fiber-reinforced resin moldings, and particularly to a method for manufacturing glass fiber-reinforced resin moldings in which glass fibers are uniformly dispersed.

BACKGROUND ART

A glass fiber reinforced resin, which is prepared by mixing glass fibers with a thermoplastic resin, can be significantly improved in strength, modulus, impact resistance, heat resistance, and the like, and therefore, such a resin is used for various plastic products. The kind of resin with which glass fibers are mixed is extended in a wide range from a general purpose resin such as polypropylene or a styrene based resin to an engineering plastic such as nylon, polycarbonate, PBT, or PET.

Glass fibers used for this purpose are called chopped strands formed by forcibly bonding several hundreds of glass fibers of about 10 µm in diameter to each other with a binder such as epoxy resin, polyurethane, or acid-modified polypropylene. If the bonding strength is weak, during the mixing of the chopped strands with resin pellets, the chopped strands are split into flake-like fibers similar to cotton waste to be increased in volume, and thereby they are not uniformly mixed with the resin. Accordingly, since the bonding strength must be stronger, the above-described resin component as the binder is required to be used in an amount of 1% or more. A molded body, characterized in that glass fibers are uniformly dispersed by incorporating such chopped strands in a resin, has been produced by a manner of heating and kneading a mixture of a raw resin and glass fiber chopped strands by an extruder to melt the resin, extruding the fiber mixed resin to prepare resin pellets in which glass fibers are uniformly dispersed, followed by feeding these pellets in an injection molding machine, heating and kneading the pellets inside the molding machine to melt the resin, and injecting the fiber mixed resin into a mold to obtain a molded body of a desired shape. Such two-stage production method, however, is disadvantageous in that not only the production cost becomes higher but also mechanical properties of the molded body may be degraded because of a phenomenon that glass fibers are rubbed with a wall surface of the molding machine or manually rubbed to be scratched or damaged.

Incidentally, if a mixture of a thermoplastic resin and glass fibers is injection molded in one stage by using only a general injection molding machine, there may occur an inconvenience that bundles of the glass fibers are liable to be formed in a molded body because of poor dispersion of the glass fibers, to cause irregularities on the surface of the molded body, with a result that not only the appearance of the molded body becomes poor but also portions in which the bundles of the glass fibers are present are weakened in strength to be easily cracked.

To improve the above inconvenience, for example, Japanese Patent Publication No. Sho 56-47847 proposes an injection molding machine additionally provided with a kneading mechanism for dispersing glass fibers, in which kneading and injection molding are simultaneously performed by making use of such a kneading mechanism.

The use of the above-described molding machine, however, is insufficient yet to uniformly disperse glass fibers, and also causes a problem that since a mixture of a resin and glass fibers is mechanically, strongly kneaded, glass fibers may be finely broken, thereby failing to sufficiently achieve the reinforcing function of the glass fibers. Another problem lies in significantly increasing the apparatus cost because of provision of such a special kneading mechanism, to raise the production cost, leading to an economical disadvantage.

In view of the foregoing, the present inventors have earnestly studied, and found that the addition of a peroxide to a thermoplastic resin makes it possible to obtain a molded body of the resin in which glass fibers are uniformly dispersed and also to easily produce a molded body of the resin in which glass fiber are uniformly dispersed by using a general purpose injection molding machine, and on the basis of such knowledge, the present inventors have accomplished the present invention.

An object of the present invention is to provide a method for manufacturing glass fiber-reinforced resin moldings, which is capable of uniformly dispersing, glass fibers in a resin and obtaining a molded body having an excellent appearance.

DISCLOSURE OF INVENTION

The present invention provides a method for manufacturing glass fiber-reinforced resin moldings including the step of manufacturing glass fiber-reinforced resin moldings by using a molding material prepared by mixing glass fibers with a thermoplastic resin, characterized in that a peroxide is added to the molding material to be molded.

Examples of thermoplastic resins as the raw resins used in the present invention may include polypropylene, polyethylene, a styrene based resin such as SAN or ABS, and nylon.

Glass fibers are added to a resin for improving the strength and elasticity of a molded body. As glass fibers used in the present invention, there can be used glass fibers generally used for manufacturing glass fiber-reinforced resin moldings of this type.

A peroxide added to a molding material may be either an organic peroxide or an inorganic peroxide. In the case of adding an organic peroxide, the content thereof may be in a range of 0.01 to 0.5 wt % on the basis of the amount of the thermoplastic resin.

According to the present invention, a molded body may be produced by either injection molding or extrusion molding. That is to say, the present invention can be applied to both the molding processes. The method of the present invention, which is applied, for example, to injection molding, will be described below. First, a thermoplastic resin, glass fibers and a peroxide are heated and kneaded in an injection molding machine, to uniformly disperse the glass fibers in the resin by the function of the peroxide. Then, the glass fiber mixed molten resin in which the glass fibers are uniformly dispersed is injected in a mold through a nozzle until the mold is filled therewith, to obtain a desired molded body.

According to the present invention, since in manufacturing glass fiber-reinforced resin moldings by using a molding material prepared by mixing glass fibers with a thermoplastic resin wherein a peroxide is added to the molding material to be molded, the glass fibers are uniformly dispersed in the resin by the function of the peroxide, to obtain a molded body having an excellent appearance. In addition, although the peroxide is added to the resin, the physical properties of the resin are not reduced and the desired physical properties of the resin can be ensured.

According to the present invention, since the uniform dispersion of glass fibers can be obtained, in the case of applying the present invention to injection molding, it is possible to eliminate the necessity of provision of a special kneading mechanism for uniformly dispersing glass fibers. Accordingly, there can be obtained an effect of adopting a conventional injection molding machine, to reduce the production cost, thereby achieving an economical advantage.

Further, according to the present invention, since the uniform dispersion of glass fibers in a resin is performed in an injection molding machine, it is possible to eliminate the necessity of adopting a two-stage production method in which resin pellets in which glass fibers are uniformly dispersed are once prepared by an extruder, and a molded body is produced by an injection molding machine by using the resin pellets. Accordingly, the present invention exhibits an effect of obtaining a molded body with a high quality in one stage by using only an injection molding machine, to reduce the number of steps, thereby lowering the production cost.

BEST MODE FOR CARRYING OUT THE INVENTION

Figure 1:
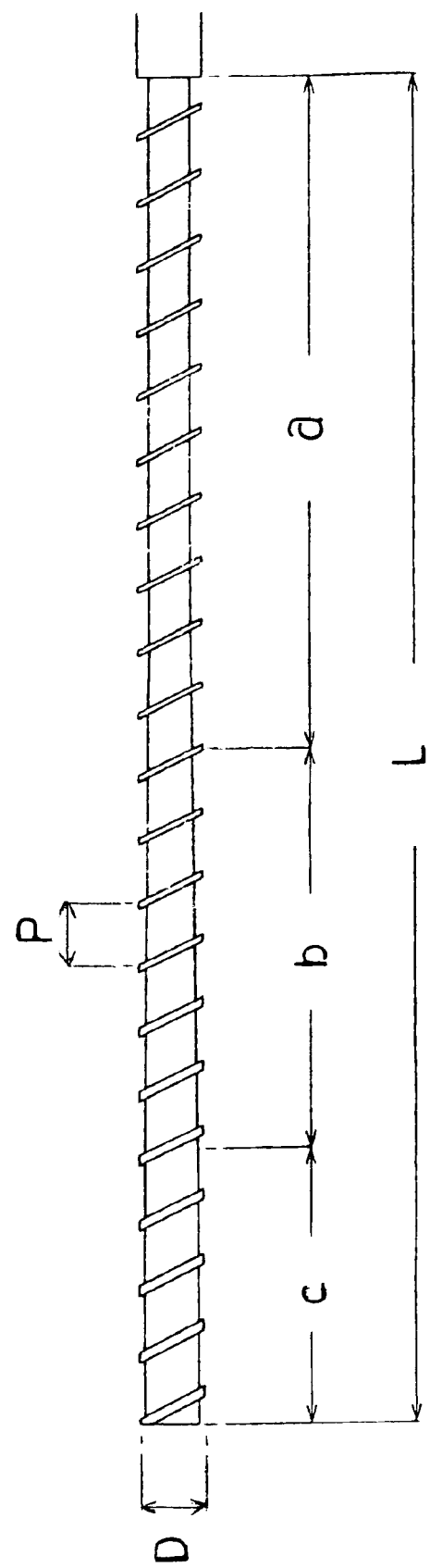
FIG. 1 shows a screw of an injection molding machine used in examples of the present invention.

The method of the present invention includes the step of manufacturing glass fiber-reinforced resin moldings by using as a molding material a thermoplastic resin with which glass fiber are mixed, wherein a peroxide is added to the molding material to be molded.

The present invention can be applied to either injection molding or extrusion molding; however, in particular, the present invention is advantageously applied to injection molding. In the case of applying the present invention to injection molding a molded body can be obtained by a general injection molding process, and accordingly, a known general purpose molding machine can be used. Examples of the injection molding machines usable in the present invention may include various molding machines such as a reciprocating screw type, a plunger type, and a screw-preplastication type machines. In particular, in the case of the in-line screw type, an injection molding machine including a full flighted screw is preferably used. Also, in the case of the screw type, a structure in which vent holes are provided in a cylinder can be used.

The molding material is a thermoplastic resin with which glass fibers are mixed. Here, the content of the glass fibers may be in a range of 10 to 60 wt %, preferably, 30 to 50 wt % on the basis of the total amount of the molding material composed of the thermoplastic resin and the glass fibers. If the content of the glass fibers is less than 10 wt %, a reinforcing effect, for example, an effect of improving the strength of the resin is insufficient, while if more than 60 wt %, the physical properties of the resin are reduced and also the moldability is degraded.

Examples of thermoplastic resins as raw resins used in the present invention may include polypropylene, polyethylene, a styrene based resin such as SAN or ABS, nylon, polycarbonate, PBT, and polyester. According to the present invention, one kind or a mixture of two kinds or more of these resins can be used as the raw resin. Polypropylene is a low cost material; however, if mixing of glass fibers with polypropylene is performed by an extruder before molding, the production cost is increased. From this viewpoint, the present invention particularly exhibits a large practical effect when being applied to molding using polypropylene as the raw resin.

In the case of using polypropylene as the raw resin in the method of the present invention, polypropylene is preferably mixed with modified polypropylene obtained by modifying polypropylene with carboxylic acid or its anhydride. The modified polypropylene has a property being good in interfacial adhesion with glass fibers and thereby being less separated from the glass fibers by applying external forces, and accordingly, by mixing such modified polypropylene, it is possible to improve the strength and surface smoothness of a molded body. Examples of the carboxylic acids used for the above modification may include maleic acid, maleic anhydride, acrylic acid, fumaric acid, itaconic acid, itaconic anhydride, and citraconic anhydride. In particular, maleic anhydride is preferably used. It should be noted that the above-described modified polypropylene may be singly used as the raw resin of the present invention.

Polypropylene may be used in the form of either a homopolymer or a copolymer. The type of copolymer may be either a block copolymer or a random copolymer; however, it is preferably a block copolymer. To obtain a molded body having a high tensile strength and a high rigidity, polypropylene is preferably used in the form of a homopolymer, while to obtain a molded body having a high impact resistance, polypropylene is preferably used in the form of a block copolymer. Examples of comonomers to be copolymerized with propylene may include ethylene, α-olefin, diolefin, and vinyl monomer. In particular, copolymerization with ethylene is most useful from the industrial viewpoint.

Various additives generally used can be added to the raw resin. For example, each of an antioxidant such as 2,6-di-t-butyl-p-cresol or tetrakis [methylene-3 (3,5-di-t-butyl-hydroxyphenyl) propionate] methane; a benzotriazole based ultraviolet absorbent; and a hindered amine type light stabilizer can be added in an amount of 0.01 to 0.5 wt % on the basis of the amount of the raw resin. Further, a nucleating agent such as talc powder, a lubricant, a plasticizer, a coloring agent (such as pigment or dye), and an inorganic filler (such as talc or calcium carbonate) can be added to the raw resin.

In the case of producing a molded body by injection molding to which the present invention is applied, the above-described raw resin, glass fibers, and the above-described peroxide are fed in a hopper of an injection molding machine. Then, the mixture is heated in the molding machine to melt the resin and simultaneously kneaded, to uniformly disperse the glass fibers in the resin by the function of the peroxide, and the glass fiber mixed molten resin in which the glass fibers are uniformly dispersed is injected into a mold through a nozzle until the mold is filled therewith, to thus produce a molded body.

In this way, according to the present invention, it is possible to produce, in one stage, a desirable molded body in which glass fibers are uniformly dispersed by using only the injection molding machine.

In the present invention, before molding, the raw resin may be previously mixed with glass fibers by using an extruder. To be more specific, there may be adopted a manner of mixing the raw resin with glass fibers in an extruder, and extruding the mixture into a strand shape to prepare glass fiber containing resin pellets, and molding a molding material composed of these resin pellets by an injection molding machine. In this case, in the resin pellets, the raw resin is not required to be uniformly mixed with the glass fibers. For example, the resin pellets may be in a non-uniformly mixed state in which bundles of the glass fibers are present. According to the present invention, even by use of the resin pellets in such a non-uniformly mixed state, it is possible to uniformly disperse the glass fibers in an injection molding machine by the function of the peroxide at the injection molding step, and hence to obtain a molded body having an excellent appearance.

According to the present invention, before molding, the peroxide is added to a molding material composed of the raw resin and glass fibers. In this case, the peroxide may be added by directly feeding the peroxide together with the molding material in a hopper of a molding machine when the molding material is fed in the hopper, or by previously kneading a mixture of the raw resin and the peroxide by an extruder, extruding the mixture to prepare resin pellets, and feeding the resin pellets together with glass fibers in the hopper of the injection molding machine. The latter masterbatch method is useful in a production field in which handling of a peroxide is hazard from the viewpoint of working environment.

The term "peroxide" in the present invention is a conceptual term including an organic peroxide and an inorganic peroxide. That is to say, either an organic peroxide or an inorganic peroxide can be used for the method of the present invention.

An organic peroxide is generally regarded as a derivative from hydrogen peroxide, more specifically, a compound in which a hydrogen atom of hydrogen peroxide substitutes for an organic group. The kind of organic peroxide used in the present invention is not particularly limited. From the viewpoint of the structures of substituents, examples of the organic peroxides used in the present invention may include a dialkylperoxide class such as $\alpha,\alpha'$ bis (t-butylperoxy) diisopropylbenzene, 2,5-dimethyl-2,5-di (t-butylperoxy) hexane, 2,5-dimethyl-2,5-di (t-butylperoxy) hexyne 3, or di-t-butylperoxide; a peroxyester class such as di-t-butylperoxybenzoate, 2,5-dimethyl-2,5-bis (benzoylperoxy) hexane, t-butylperoxy-2-ethylhexanoate; a peroxyketal class such as n-butyl-4,4-bis (t-butylperoxy) valerate, 1,1-bis (t-butylperoxy) 3,3,5-trimethylcyclohexane; a peroxydicarbonate class such as 1,6-bis (t-butylperoxycarbonyloxy) hexane; and a hydroperoxide class such as p-menthanehydroperoxide. In particular, the dialkylperoxide class and peroxyester class are preferably used.

More specifically, the organic peroxide used in the present invention preferably satisfies the following requirements of:

1) having a decomposition characteristic in which a decomposition temperature for a half-life of one minute is in a range of 150° C. to 260° C.; and 2) having two pieces of —O—O— group in a molecule.

The organic peroxide satisfying either of the above requirements 1) and 2) is preferable, and the organic peroxide satisfying both the requirements 1) and 2) is more preferable.

Examples of the organic peroxides satisfying both the requirements 1) and 2) may include $\alpha,\alpha'$ bis (t-butylperoxy) diisopropylbenzene, 2,5-dimethyl-2,5-di (t-butylperoxy) hexane, 1,3-bis (t-butylperoxyisopropyl) benzene, and 2,5-dimethyl-2,5-di (t-butylperoxy) hexyne 3.

The content of the above-described peroxide may be in a range of 0.01 to 0.5 wt %, preferably, 0.05 to 0.3 wt % on the basis of the amount of a thermoplastic resin used as the raw resin. If the content is less than 0.01 wt %, it is difficult to uniformly disperse glass fibers in the resin, while if more than 0.5 wt %, the physical properties of the resin are undesirably reduced because free radicals caused by decomposition of the organic peroxide excessively act on the resin.

Examples of the inorganic peroxides used in the present invention may include ammonium peroxydisulfate and potassium peroxydisulfate.

To manufacture glass fiber-reinforced resin moldings in accordance with the present invention, the injection molding process is usually adopted. For such injection molding, in accordance with the present invention, a special injection molding machine is not required to be used but a conventional injection molding machine can be used. Of conventional injection molding machines, a reciprocating screw type injection molding machine is preferably used in the present invention. A preferable structure of the reciprocating screw type injection molding machine used in the present invention will be described below. A ratio L/D, which is a ratio of a length L of a screw to a diameter D of the screw, may be in a range of 15 to 25, preferably, 20 to 25. The above-described molding machine has a structure in which a root diameter of the screw is deep in the feed portion, being made gradually shallow in the compression portion, and becomes shallowest in the metering portion; thus the compression ratio, which is the ratio of the depth of the metering portion to the depth of the feed portion, may be in a range of 1.5 to 4.0, preferably, 2.0 to 3.0. If the compression ratio is less than 1.5, the uniform plasticization of the resin is difficult and also the dispersion of glass fibers is liable to be poor, while if more than 4.0, glass fibers are excessively compressed to be damaged, so that the strength of a molded body may be insufficient.

In the case of applying the present invention to injection molding, there can be obtained a molded body excellent in appearance and physical properties, in which glass fibers are uniformly dispersed in the resin.

The present invention can be applied not only to injection molding but also to a process of producing a molded body by an extrusion molding method. Specifically, resin pellets can be produced by mixing glass fibers and the peroxide with the raw resin, heating and kneading the mixture in an extrusion molding machine, and extruding the glass fiber mixed molten resin into a strand shape, to thus obtain the resin pellets. In this case, the extruder used is not required to include a kneading mechanism for intensively dispersing the glass fibers, for example, a Dulmage type kneading mechanism but may include a usual full flight screw in which the compression ratio is in a range of 2.0 to 3.0 and the ratio (L/D) of a length L to a diameter D of the screw is about 20. According to the present invention, even in the case of using the extruder with no kneading mechanism, it is possible to desirably disperse glass fibers. Also, since such a kneading mechanism is not used, the glass fibers are less damaged, and the throughput becomes larger, thereby improving the economical efficiency. Incidentally, to prevent breakage and damage of glass fibers, there has been adopted a method using a biaxial extruder, in which glass fibers are forcibly fed from the downstream side of the extruder into the resin melted in the front half of the extruder to mix the glass fibers with the resin, and the glass fiber mixed molten resin is extruded to produce resin pellets. This method, however, has a problem that the structure of the extruder is complicated and the production cost is also raised. In accordance with the present invention, it is possible to produce pellets of a glass fiber reinforced resin having an excellent physical properties with reduced damage of glass fibers by using an extruder with a simple structure. Even in the resin pellets obtained by extrusion molding to which the present invention is applied, glass fibers are similarly, uniformly dispersed in the resin, and in the case of, for example, injection molding the resin pellets taken as a molding material, it is possible to obtain a molded body excellent in appearance and physical properties, in which the glass fibers are uniformly dispersed.

The present invention can be also advantageously applied to production of molded bodies shaped into a sheet, a rod, a pipe, and profiles by extrusion molding. That is to say, in the case of producing the above molded body by extrusion molding, there occurs a problem associated with floating of glass fibers on the surface of the molded body, and accordingly, resin pellets previously prepared by extrusion molding are generally used. On the contrary, by applying the present invention to extrusion molding, it is possible, to directly produce a molded body by extrusion molding using a mixture of a raw resin, glass fibers and a peroxide as a molding material, and hence to increase the economical efficiency and also improve the strength because of reduced breakage and damage of the glass fibers.

In the present invention, the reason why glass fibers are uniformly dispersed in a resin by adding a peroxide into the resin is not necessarily clarified but may be considered as follows: namely, by adding a peroxide to a resin which is poor in wettability against glass fibers, the wettability of the resin against the glass fibers is improved, and the improvement in wettability promotes dispersion of the glass fibers in the resin, to thereby obtain uniform dispersion of the glass fibers in the resin.

EXAMPLES

Hereinafter, examples of the present invention will be described. Inventive Examples 1 to 25, Comparative Examples 1 to 3.

Molding materials having compositions shown in Tables 1 and 2 were prepared using polypropylene or a mixture of polypropylene and maleic anhydride modified polypropylene as a raw resin. Each of the molding materials was fed in an injection molding machine through a hopper by gravitational feeding. Components shown in Tables 1 and 2 are as follows:
1) PP: polypropylene in the form of pellets (BJHH-1352, produced by Grand Polymer Co., Ltd.)
2) MPP: maleic anhydride modified polypropylene [Lonply MMP006 (MAH graft ratio: 0.4%), produced by Grand Polymer Co., Ltd.]
3) Peroxide
   A: α,α' bis (t-butylperoxy) diisopropylbenzene (Perbutyl P40, produced by NOF CORPORATION)
   B: 2,5-dimethyl-2,5-di (t-butylperoxy) hexane (Perhexa 25B, produced by NOF CORPORATION)
   C: 2,5-dimethyl-2,5-di (t-butylperoxy) hexyne 3 (Kayahexa YD50C, produced by Kayaku AKZO Corporation)
   D: di-t-butylperoxide (Perbutyl D, produced by NOF CORPORATION)
   E: t-butylperoxybenzoate (Perbutyl Z, produced by NOF CORPORATION)
   F: 2,5-dimethyl-2,5-bis (benzoylperoxy) hexane (Perhexa 25Z, produced by NOF CORPORATION)
   G: t-butylperoxy-2-ethylhexanoate (Perbutyl O, produced by NOF CORPORATION)
   H: n-butyl-4,4-bis (t-butylperoxy) valerate (Perhexa V-40, produced by NOF CORPORATION)
   I: 1,1-bis (t-butylperoxy) 3,3,5-trimethylcyclohexane (Perhexa 3M-40, produced by NOF CORPORATION)
   J: 1,6-bis (t-butylperoxycarbonyloxy) hexane (Kayalene 6-70, produced by Kayaku AKZO Corporation)
   K: p-menthanehydroperoxide (Permenta H, produced by NOF CORPORATION)

The decomposition temperature for a half-life of one minute of each of the above peroxides is as follows:
   A: 175.4° C.
   B: 179.8° C.
   C: 193.0° C.
   D: 185.9° C.
   E: 166.8° C.
   F: 158.2° C.
   G: 134.0° C.
   H: 172.5° C.
   I: 149.0° C.
   J: 150.0° C.
   K: 199.5° C.
4) nylon 6: TB310B, produced by Teijin Limited
5) antioxidant: hindered phenolio antioxidant (Adekastab AO-60, produced by Asahi Denka Kogyo K.K.)
6) light stabilizer: hindered amine light stabilizer (Tinuvin 622LD, produced by Ciba-Geigy Japan Limited)
7) glass fiber: CS3J-254S, produced by Nitto Boseki Co., Ltd.

As the injection molding machine, an injection molding machine J75E2 produced by The Japan Steel Works, Ltd. was used. The injection molding machine is a general purpose molding machine, and has a screw structure shown in FIG. 1. In the screw, a total length (L) is 670 mm; a diameter (D) is 32 mm; a pitch (P) is 32 mm; a ratio L/D is 21; and a compression ratio is 2.2. The screw is of a full flight type, and a zone ratio (feed portion "a": compression portion "b": metering portion "c") is 5: 3: 2.

The molding materials having the compositions shown in Tables 1 and 2 were molded by the above injection molding machine under the following molding conditions, to prepare a plurality of test pieces.

Molding Conditions:
   cylinder temperature: 250° C.
   mold temperature: 60° C.
   screw rotation: 63 rpm
   back pressure: 40 kgf/cm$^2$ The plurality of test pieces thus obtained were the subjected to the following tests:
(1) tensile strength: in accordance with ASTM D638
(2) elongation percentage: in accordance with ASTM D638
(3) flexural strength: in accordance with ASTM D790
(4) flexural modulus: in accordance with ASTM D790
(5) Izod impact strength: in accordance with ASTM D256
(6) dispersion state of glass fibers in Resin: observed for each of the 20 pieces of test pieces, and evaluated under the following criterion:
   ⊚: (100% of total test pieces, observed to be in glass fiber uniformly dispersed state)
   ○: (90% of total test pieces, observed to be in glass fiber uniformly dispersed state)
   X : (total test pieces, observed such that dispersion state of glass fibers is poor and chopped strands are almost left as they are)
(7) surface roughness Test pieces each having a length of 80 mm, a width of 45 mm and a thickness of 3 mm were prepared and were measured in terms of surface roughness under JIS B0601 (1987 version). The surface roughness is expressed in ten point mean roughness (Rz) and maximum height (Ry). In this case, five measurements were performed for one test piece, and a mean value of measured values at the total ten measurements of two test pieces was obtained.

The results of the above tests are shown in Tables 3 and 4.

Inventive Example 26

First, a peroxide A ( α,α' bis (t-butylperoxy) diisopropylbenzene) was mixed into polypropylene (BJHH-1352, produced by Grand Polymer Co., Ltd.) in an amount of 0.1 part by weight on the basis of 100 parts by weight of polypropylene. The mixture was fed in a hopper of a biaxial extruder, being heated and kneaded, and extruded in a strand shape from a nozzle. The stranded mixture was water-cooled, and cut into resin pellets. The extrusion conditions are as follows:

twin-screw extruder: NRII-46 mmSG, produced by Freesia Macross Corporation cylinder temperature: 230° C.

screw rotation: 300 rpm

L/D=40 first stage: L/D=24 (6.5 for kneading block)

second stage: L/D=16 (4.0 for kneading disk)

Here, the resin pellets thus obtained are called "modified PP". The modified PP was mixed with the same glass fibers as those used in Inventive Examples 1 to 25 at a mixing ratio shown in Table 5, and the mixture was fed in a hopper of the same injection molding machine as that used in Inventive Examples 1 to 25. The mixture was injection molded in the same molding conditions as those in Inventive Examples 1 to 25, to prepare a plurality of test pieces.

The plurality of test pieces thus obtained were subjected to the same tests as those in Inventive Examples 1 to 25 except for measurement of surface roughness. The results are shown in Table 5.

Inventive Example 27

The modified PP in the form of the resin pellets obtained by the twin screw extruder in Inventive Example 26 was mixed with the same maleic anhydride modified polypropylene (MPP) and glass fibers as those used in Inventive Example 1 at a mixing ratio shown in Table 5, and the molding material thus obtained was injection-molded in the same molding conditions as those in Inventive Examples 1 to 25, to prepare a plurality of test pieces.

The plurality of test pieces thus obtained were subjected to the same tests as those in Inventive Examples 1 to 25 except for measurement of surface roughness. The results are shown in Table 5.

Inventive Example 28, Comparative Example 3

Molding materials having compositions shown in Table 6 were obtained using SAN as the raw resin, and were injection molded in the same manner as that in Inventive Examples 1 to 25, to prepare a plurality of test pieces. In addition, the peroxide shown in Table 6 is the same as the peroxide A used in Inventive Example 1. The injection molding conditions are as follows:
Molding Conditions:

cylinder temperature: 250° C.

mold temperature: 70° C.

screw rotation: 64 rpm back pressure: 40 kgf/cm$^2$

The plurality of test pieces thus obtained were subjected to the same tests as those in Inventive Examples 1 to 25 except for measurement of surface roughness. The results are shown in Table 6.

Inventive Example 29, Comparative Example 5

Molding materials having compositions shown in Table 6 were obtained using polycarbonate as the raw resin, and were injection molded in the same manner as that in Inventive Examples 1 to 25, to prepare a plurality of test pieces. In addition, the peroxide shown in Table 6 is the same as the peroxide A used in Inventive Example 1. The injection molding conditions are as follows:

Molding Conditions:

cylinder temperature: 290° C.

mold temperature: 80° C.

screw rotation: 64 rpm back pressure: 40 kgf /cm$^2$

The plurality of test pieces thus obtained were subjected to the same tests as those in Inventive Examples 1 to 25 except for measurement of surface roughness. The results are shown in Table 6.

In the above-described inventive examples and comparative examples, in the case where the peroxide was added to the raw resin (Inventive Examples 1 to 29), the glass fibers were uniformly dispersed and the molded body excellent in appearance was obtained. On the contrary, in the case where the peroxide was not added to the raw resin (Comparative Examples 1 to 5), the dispersion of the glass fibers was poor and the molded body practically usable was not obtained. Further, as a result of measurement of surface roughness, it is apparent that the molded body in which the dispersion of the glass fibers is good exhibits a small surface roughness, while the molded body in which the dispersion of the glass fibers is poor exhibits a large surface roughness. Accordingly, it can be decided whether the dispersion of glass fibers of a molded body is good or poor on the basis of the surface roughness of the molded body. From the values of Rz and Ry in Tables 3 and 4, it is apparent that Inventive Examples 1 to 25 are superior in the dispersion state of glass fibers to Comparative Examples 1 to 3. Further, as is apparent from Inventive Examples 1 to 29 and Comparative Examples 1 to 5, the addition of the peroxide to the raw resin does not exert adverse effect on the physical properties such as tensile strength of the raw resin, and therefore, even if the peroxide is added to the raw resin, the inherent physical properties of the resin can be kept.

TABLE 1

(unit: parts by weight)

| | raw resin | | peroxide | | nylon 6 | antioxidant | light satabilizer | glass fiber |
|---|---|---|---|---|---|---|---|---|
| | PP | MPP | | | | | | |
| Inventive Example | | | | | | | | |
| 1 | 66.7 | 33.3 | A | 0.05 | — | — | — | 100 |
| 2 | 66.7 | 33.3 | A | 0.075 | — | — | — | 100 |
| 3 | 66.7 | 33.3 | A | 0.1 | — | — | — | 100 |
| 4 | 66.7 | 33.3 | A | 0.2 | — | — | — | 100 |
| 5 | 66.7 | 33.3 | A | 0.3 | — | — | — | 100 |
| 6 | 66.7 | 33.3 | A | 0.4 | — | — | — | 100 |
| 7 | 66.7 | 33.3 | B | 0.05 | — | — | — | 100 |
| 8 | 66.7 | 33.3 | B | 0.1 | — | — | — | 100 |
| 9 | 66.7 | 33.3 | B | 0.3 | — | — | — | 100 |
| 10 | 66.7 | 33.3 | C | 0.1 | — | — | — | 100 |
| 11 | 66.7 | 33.3 | D | 0.1 | — | — | — | 100 |
| 12 | 66.7 | 33.3 | E | 0.1 | — | — | — | 100 |
| 13 | 66.7 | 33.3 | F | 0.1 | — | — | — | 100 |
| 14 | 66.7 | 33.3 | G | 0.1 | — | — | — | 100 |

TABLE 2

(unit: parts by weight)

| | raw resin | | peroxide | | nylon 6 | antioxidant | light satabilizer | glass fiber |
|---|---|---|---|---|---|---|---|---|
| | PP | MPP | | | | | | |
| Inventive Example | | | | | | | | |
| 15 | 66.7 | 33.3 | H | 0.25 | — | — | — | 100 |
| 16 | 66.7 | 33.3 | I | 0.1 | — | — | — | 100 |
| 17 | 66.7 | 33.3 | J | 0.1 | — | — | — | 100 |
| 18 | 66.7 | 33.3 | K | 0.1 | — | — | — | 100 |
| 19 | 66.7 | 33.3 | A | 0.1 | — | 0.1 | — | 100 |
| 20 | 66.7 | 33.3 | A | 0.1 | — | — | 0.5 | 100 |
| 21 | 66.7 | 33.3 | A | 0.1 | 10 | — | — | 100 |
| 22 | 66.7 | 33.3 | A | 0.1 | 10 | 0.2 | — | 100 |
| 23 | 100 | — | A | 0.05 | — | — | — | 100 |
| 24 | 100 | — | A | 0.1 | — | — | — | 100 |
| 25 | 100 | — | A | 0.3 | — | — | — | 100 |
| Comparative Example | | | | | | | | |
| 1 | 66.7 | 33.3 | — | — | — | — | — | 100 |
| 2 | 60 | 30 | — | — | 10 | — | — | 100 |
| 3 | 100 | — | — | — | — | — | — | 100 |

TABLE 3

| | tensile strength (kg/mm2) | elong. (%) | flexural strength (kg/mm2) | flexural modulus (kg/mm2) | Izod impact (kg·cm/cm) | dispersion state of glass fibers | surface roughness | |
|---|---|---|---|---|---|---|---|---|
| | | | | | | | Rz | Ry |
| Inventive Example | | | | | | | | |
| 1 | 12.1 | 11.5 | 21.3 | 1227 | 17.5 | ◉ | 8.8 | 11.4 |
| 2 | 11.6 | 11.5 | 23.1 | 929 | 17.4 | ◉ | 7.4 | 9.4 |
| 3 | 12.1 | 11.3 | 23.4 | 960 | 16.1 | ◉ | 8.0 | 11.4 |
| 4 | 11.6 | 10.9 | 19.9 | 1227 | 15.3 | ◉ | 7.8 | 8.6 |
| 5 | 11.2 | 10.8 | 19.5 | 1217 | 13.6 | ◉ | 6.0 | 7.9 |
| 6 | 12.4 | 10.9 | 19.8 | 1046 | 21.1 | ◉ | 5.9 | 7.3 |
| 7 | 12.0 | 11.9 | 20.8 | 1160 | 20.5 | ◉ | 6.1 | 8.6 |
| 8 | 11.9 | 11.6 | 21.0 | 1170 | 18.7 | ◉ | 7.5 | 10.0 |
| 9 | 11.8 | 11.6 | 20.3 | 1160 | 18.1 | ◉ | 7.9 | 10.0 |
| 10 | 11.4 | 11.7 | 20.6 | 1180 | 15.0 | ◉ | 7.0 | 9.3 |
| 11 | 12.0 | 11.4 | 21.0 | 1130 | 19.7 | ○ | 8.2 | 10.9 |
| 12 | 11.5 | 11.7 | 21.3 | 1200 | 19.7 | ◉ | 11.6 | 15.7 |

TABLE 3-continued

| | tensile strength (kg/mm2) | elong. (%) | flexural strength (kg/mm2) | flexural modulus (kg/mm2) | Izod impact (kg:cm/cm) | dispersion state of glass fibers | surface roughness Rz | surface roughness Ry |
|---|---|---|---|---|---|---|---|---|
| 13 | 11.9 | 11.1 | 20.7 | 1140 | 20.7 | ○ | 8.3 | 10.3 |
| 14 | 11.7 | 11.2 | 21.4 | 1130 | 21.5 | ○ | 9.9 | 13.4 |
| 15 | 11.9 | 11.5 | 21.0 | 1190 | 18.9 | ◎ | 8.2 | 10.0 |
| 16 | 11.7 | 11.2 | 20.7 | 1180 | 20.7 | ○ | 9.8 | 13.4 |

TABLE 4

| | tensile strength (kg/mm2) | elong. (%) | flexural strength (kg/mm2) | flexural modulus (kg/mm2) | Izod impact (kg:cm/cm) | dispersion state of glass fibers | surface roughness Rz | surface roughness Ry |
|---|---|---|---|---|---|---|---|---|
| Inventive Example | | | | | | | | |
| 17 | 11.7 | 11.6 | 20.9 | 1180 | 20.0 | ○ | 10.3 | 13.9 |
| 18 | 11.5 | 11.2 | 20.8 | 1110 | 20.3 | ○ | 9.8 | 13.4 |
| 19 | 12.1 | 10.9 | 20.2 | 1318 | 18.1 | ◎ | 7.2 | 9.3 |
| 20 | 11.6 | 11.1 | 20.4 | 1194 | 16.4 | ◎ | 6.1 | 7.9 |
| 21 | 12.8 | 12.0 | 22.7 | 1183 | 17.9 | ◎ | 7.8 | 9.8 |
| 22 | 12.6 | 12.0 | 22.3 | 1231 | 18.5 | ◎ | 7.9 | 9.9 |
| 23 | 4.4 | 6.1 | 9.4 | 1072 | 20.1 | ◎ | 7.6 | 10.4 |
| 24 | 4.1 | 6.8 | 8.8 | 1063 | 19.7 | ◎ | 6.7 | 9.2 |
| 25 | 4.1 | 6.9 | 8.6 | 1076 | 22.3 | ◎ | 4.3 | 5.4 |
| Comparative Example | | | | | | | | |
| 1 | 12.0 | 11.1 | 21.3 | 1101 | 22.4 | X | 12.5 | 18.6 |
| 2 | 12.3 | 11.2 | 21.4 | 1327 | 24.0 | X | 14.6 | 21.3 |
| 3 | 4.1 | 6.4 | 9.1. | 1162 | 22.6 | X | 14.5 | 21.1 |

TABLE 5

| | Inventive Example 26 | Inventive Example 27 |
|---|---|---|
| modified PP (parts by weight) | 100 | 66.7 |
| MPP (parts by weight) | — | 33.3 |
| glass fiber (parts by weight) | 100 | 100 |
| tensile strength (kg/mm$^2$) | 4.2 | 12.0 |
| elongnation (%) | 5.0 | 11.6 |
| flexural strength (kg/mm$^2$) | 8.1 | 20.9 |
| flexural modulus (kg/mm$^2$) | 1170 | 1180 |
| Izod impact (kg · cm/cm) | 8.7 | 16.7 |
| dispersion state of glass fiber | ◎ | ◎ |

TABLE 6

| | Inventive Example 28 | Comparative Example 4 | Inventive Example 29 | Comparative Example 5 |
|---|---|---|---|---|
| SAN resin (parts by weight) | 70 | 70 | — | — |
| polycarbonate (parts by weight) | — | — | 70 | 70 |
| peroxide (parts by weight) | 0.1 | — | 0.1 | — |
| glass fiber (parts by weight) | 30 | 30 | 30 | 30 |
| tensile strength (kg/mm$^2$) | 11.5 | 10.6 | 14.2 | 13.7 |
| elognation (%) | 8.0 | 7.5 | 10.7 | 10.8 |
| flexural strength (kg/mm$^2$) | 20.1 | 18.5 | 22.4 | 21.8 |
| flexural modulus (kg/mm$^2$) | 1068 | 1001 | 921 | 844 |
| Izod impact (kg · cm/cm) | 12.7 | 10.3 | 15.4 | 15.1 |
| dispersion state of glass fibers | ◎ | X | ◎ | X |

INDUSTRIAL APPLICABILITY

The present invention relates to an improved method for manufacturing glass fiber-reinforced resin moldings by mixing glass fibers with a thermoplastic resin. The molded body produced in accordance with the method of the present invention is characterized in that glass fibers are uniformly dispersed in the resin, therefore, is industrially advantageous in that a molded body with a high quality can be produced at a low cost.

What is claimed is:

1. A method for manufacturing glass fiber-reinforced resin moldings, characterized by heating and kneading a raw thermoplastic resin, glass fiber chopped strands, and a separate organic peroxide in an injection molding machine to uniformly disperse glass fibers in the resin, and directly injecting the glass fiber mixed molten resin, in which the glass fibers are uniformly dispersed, into a mold from the injection molding machine to obtain a molded body.

2. A method for manufacturing glass fiber-reinforced resin moldings according to claim 1, wherein the organic peroxide is an organic peroxide having a decomposition characteristic in which a decomposition temperature for a half-life in one minute is in a range of 150° C. to 260° C.

3. A method for manufacturing glass fiber-reinforced resin moldings according to claim 1, wherein the organic peroxide is an organic peroxide having two —O—O— groups in a molecule.

4. A method for manufacturing glass fiber-reinforced resin moldings according to claim 1, wherein the content of the organic peroxide is in a range of 0.01 to 0.5 wt % on the basis of the amount of the thermoplastic resin.

5. A method for manufacturing glass fiber-reinforced resin moldings according to claim 1, wherein the thermoplastic resin is polypropylene and/or modified polypropylene.

6. A method for manufacturing glass fiber-reinforced resin moldings according to claim 1, wherein the organic peroxide is an organic peroxide having a decomposition characteristic in which a decomposition temperature for a half-life of one minute is in a range of 150° C. to 260° C. and having two —O—O— groups in a molecule.

7. A method for manufacturing glass fiber-reinforced resin moldings according to claim 1, wherein the organic peroxide is at least one kind selected from the group consisting of α,α'-bis(t-butylperoxy)diisopropylbenzene, 2,5-dimethyl-2,5-di(t-butylperoxy)hexane, 1,3-bis(t-butylperoxyisopropyl)benzene, and 2,5-dimethyl-2,5-di(t-butylperoxy)hexane 3.

8. A method for manufacturing glass fiber-reinforced resin moldings according to claim 1, wherein the content of the glass fibers is in a range of 10 wt % to 60 wt % on the basis of the total amount of the thermoplastic resin and the glass fiber chopped strands.

9. A method for manufacturing glass fiber-reinforced resin moldings according to claim 1, wherein the injection molding machine is configured as an in-line screw type injection molding machine including a full-flighted screw having a ratio (L/D) of a length (L) to a diameter (D) of the screw being in a range of 15 to 25 and a compression ratio expressed by a ratio of a depth of a metering portion to a depth of a feed portion being in a range of 1.5 to 4.0.

* * * * *

UNITED STATES PATENT AND TRADEMARK OFFICE
CERTIFICATE OF CORRECTION

PATENT NO. : 6,652,796 B1
DATED : November 25, 2003
INVENTOR(S) : Takeshi Moriwaki et al.

It is certified that error appears in the above-identified patent and that said Letters Patent is hereby corrected as shown below:

<u>Title page,</u>
Item [73], Assignee, change "Kishimoto Sangyu Co Ltd, Osaka (JP)" to
-- Kishimoto Sangyo Co., Ltd., Osaka (JP) --

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,652,796 B1                                                         Page 1 of 1
DATED        : November 25, 2003
INVENTOR(S)  : Takeshi Moriwaki et al.

It is certified that error appears in the above-identified patent and that said Letters Patent is hereby corrected as shown below:

<u>Title page,</u>
Item [22], change "[22] PCT Filed: May 5, 1999" to -- [22] PCT Filed: May 26, 1999 --

Signed and Sealed this

Twenty-seventh Day of July, 2004

JON W. DUDAS
*Acting Director of the United States Patent and Trademark Office*